(12) United States Patent
Relyea et al.

(10) Patent No.: US 7,827,202 B2
(45) Date of Patent: Nov. 2, 2010

(54) CONTENT SCHEDULING FOR FANTASY GAMING

(75) Inventors: Don Relyea, Dallas, TX (US); Brian Roberts, Frisco, TX (US); Heath Stallings, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 300 days.

(21) Appl. No.: 11/859,316

(22) Filed: Sep. 21, 2007

(65) Prior Publication Data

US 2009/0083322 A1 Mar. 26, 2009

(51) Int. Cl.
G06F 17/30 (2006.01)
(52) U.S. Cl. ............... 707/793; 463/40; 725/39; 707/951
(58) Field of Classification Search ........... 707/999.1, 707/999.102, 999.107, 705, 793
See application file for complete search history.

(56) References Cited

U.S. PATENT DOCUMENTS

| | | | | |
|---|---|---|---|---|
| 5,758,257 A * | 5/1998 | Herz et al. | ................ | 725/116 |
| 7,079,176 B1 * | 7/2006 | Freeman et al. | ......... | 348/207.1 |
| 2002/0049980 A1 * | 4/2002 | Hoang | ................ | 725/91 |
| 2003/0182567 A1 * | 9/2003 | Barton et al. | ............. | 713/193 |
| 2003/0229900 A1 * | 12/2003 | Reisman | ................ | 725/87 |
| 2004/0117838 A1 * | 6/2004 | Karaoguz et al. | ............ | 725/86 |
| 2005/0120373 A1 * | 6/2005 | Thomas et al. | ............... | 725/58 |
| 2006/0183547 A1 * | 8/2006 | McMonigle | ............... | 463/40 |
| 2007/0021167 A1 * | 1/2007 | Ma et al. | ................ | 463/4 |
| 2007/0022029 A1 * | 1/2007 | Ma et al. | ................ | 705/35 |
| 2007/0113250 A1 * | 5/2007 | Logan et al. | ................ | 725/46 |
| 2008/0026804 A1 * | 1/2008 | Baray et al. | ................ | 463/9 |
| 2008/0032797 A1 * | 2/2008 | Harris et al. | ................ | 463/40 |
| 2008/0052744 A1 * | 2/2008 | Hamasaka | ................ | 725/58 |
| 2008/0066111 A1 * | 3/2008 | Ellis et al. | ................ | 725/57 |
| 2008/0076497 A1 * | 3/2008 | Kiskis et al. | ................ | 463/9 |
| 2008/0102911 A1 * | 5/2008 | Campbell et al. | ............ | 463/9 |

* cited by examiner

*Primary Examiner*—John R. Cottingham
*Assistant Examiner*—Susan F Rayyan

(57) ABSTRACT

A user database includes information concerning at least one entity of interest. A program database includes multimedia content information associated with items of multimedia content and including a temporal interval during which the items of multimedia content are available. A presentation scheduling facility is communicatively coupled to the user database and the program database. The presentation scheduling facility is configured to determine a number of items of multimedia content that are associated with the at least one entity of interest based on the information concerning the at least one entity of interest and the multimedia content information, and configured to provide a scheduling screen containing identifications of the determined number of items of multimedia content.

25 Claims, 14 Drawing Sheets

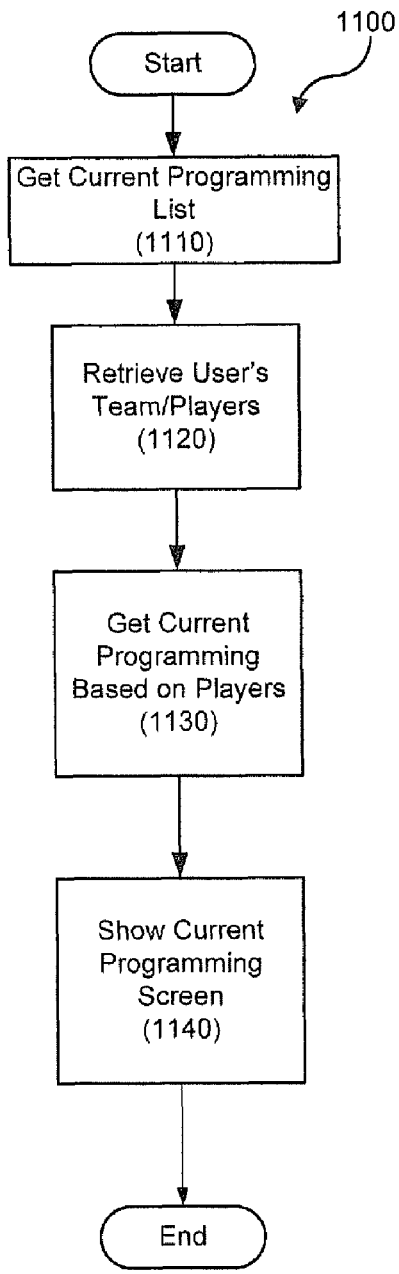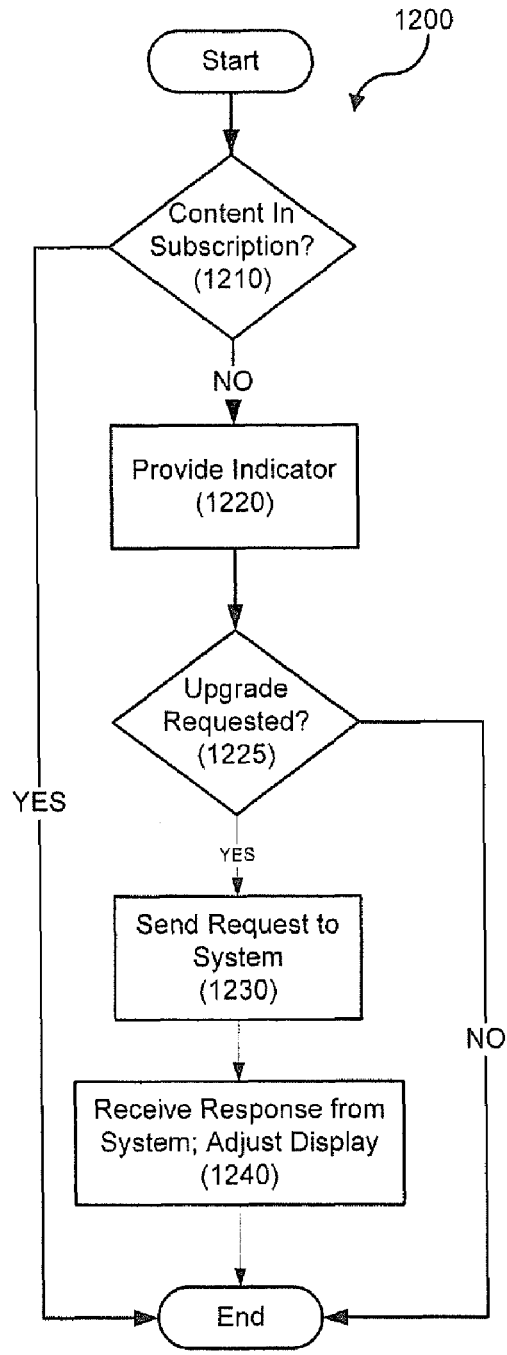
Fig. 11
Fig. 12

CONTENT SCHEDULING FOR FANTASY GAMING

BACKGROUND INFORMATION

Fantasy games are a competition among fantasy team owners/managers who are typically participants (i.e., individual persons) in a club or fantasy league organization. Common fantasy games include football, baseball, and basketball, among others. Indeed, any organized competitive endeavor may be modeled in a fantasy game.

Each fantasy team owner selects players from a "real-life" competitive league (e.g., the National Football League), to create a "fantasy" team that will compete with other fantasy teams throughout the season. Player selection is usually performed in an auction or a draft which allows fantasy owners to place valuations on each player for purposes of the fantasy competition. Fantasy team owners can perform various actions with their teams that mimic the actions available to real-life team owners. For example, players may be traded during the season between fantasy owners, players who were not previously selected may be obtained as "free agents," and underperforming players may be "waived".

Once the season starts, fantasy team point accumulation may begin. Each of the players selected may accumulate or take away points from their fantasy team based on their real-world performance. For example, in a football fantasy league, where a player in the real-world makes a touchdown, six (6) points may be given to the fantasy team that has enrolled that particular player. However, if the same player were to throw an interception, minus two (−2) points are given to the fantasy team that has enrolled that particular player. In this way, each of the real-world players contributes to the fantasy team each week of play.

In general, team owners desire to observe games in which their selected players will be performing. However, watching as many games as possible requires a heavy burden upon the team owner to locate the network programming and track the times of each event. This is particularly frustrating when games overlap such that the team owner must choose between, or in some cases switch between multiple channels periodically. Moreover, live tracking of a team owner's progress during the day is not provided with simple television coverage.

BRIEF DESCRIPTION OF THE DRAWINGS

FIG. 11 is an example of a process flow for determining current games associated with a user's players of interest.

FIG. 12 is an example of a process flow for permitting a user to obtain access to media content that is not available in the user's subscription level.

DETAILED DESCRIPTION OF PREFERRED EMBODIMENTS

Figure 1:
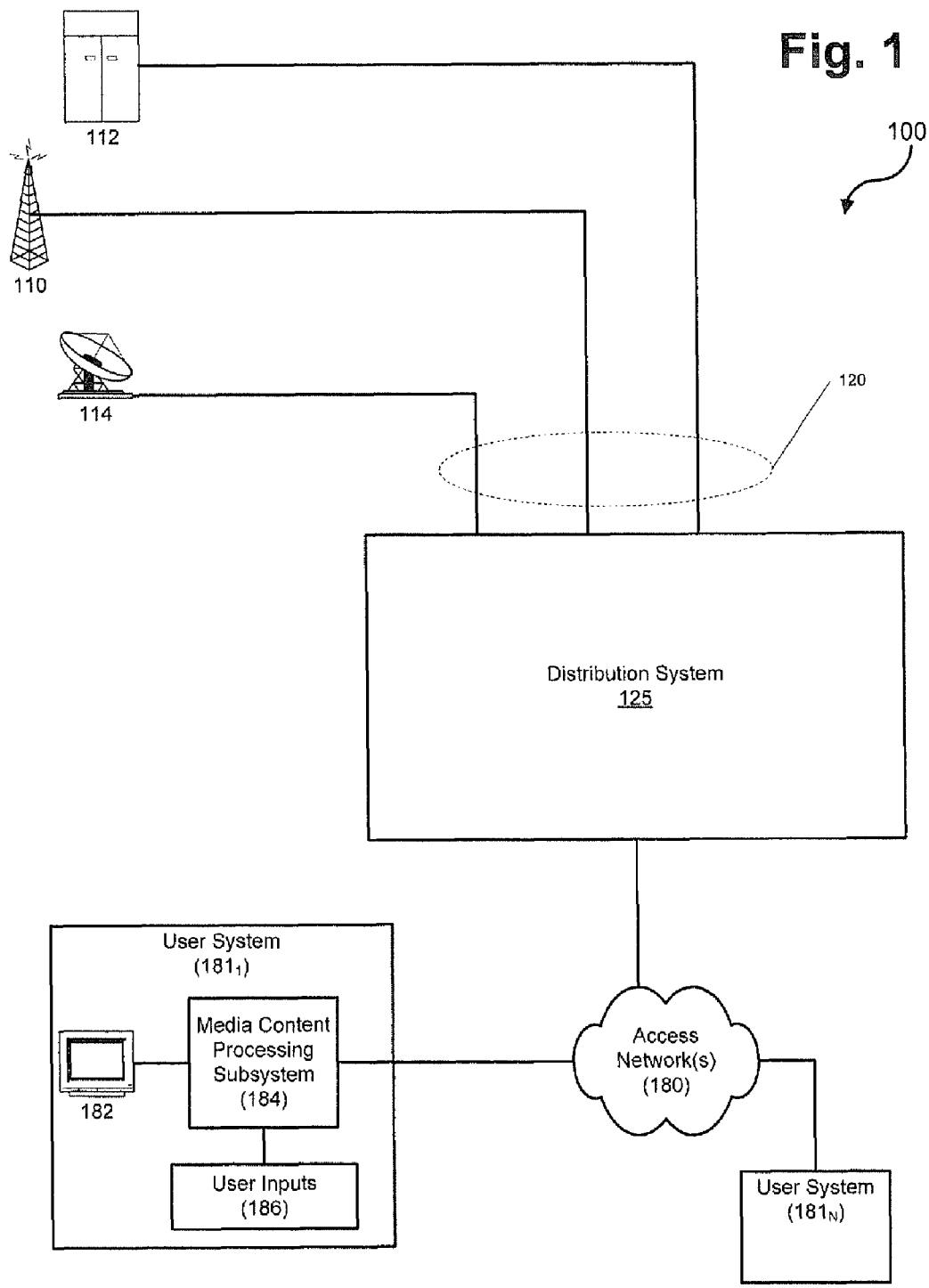
FIG. 1 is an example of a content distribution system.

Referring now to the drawings, illustrative embodiments are shown in detail. Although the drawings represent the embodiments, the drawings are not necessarily to scale and certain features may be exaggerated to better illustrate and explain an embodiment. Further, the embodiments described herein are not intended to be exhaustive or otherwise limit or restrict the invention to the precise form and configuration shown in the drawings and disclosed in the following detailed description.

As discussed herein, "multimedia content" (or simply "media content") is inclusive of audio, video and related data (e.g., metadata, control information, interactive gaming information), whether provided as a stream or in bulk (e.g., a file). As discussed herein, "video" is inclusive of visual imagery (static and moving) and any audio signals and other information signals that may be associated with such video (e.g., an NTSC-formatted transmitted television signal, an MPEG formatted multimedia transmission, closed captioning information, etc.).

Also as discussed herein, "databases" are repositories for information or content and physically may take the form of one or more storage media which may be incorporated into one or more physical systems (and, in the case of multiple physical systems, may be deployed in a distributed fashion over multiple locations), as is well known. Furthermore, databases may take the form of any well known data model and use any well known underlying technology (e.g., unstructured file systems, flat files, relational databases, object-oriented databases, XML databases, hierarchical structures, etc.). References herein to a "record" or "field" in a database are intended to include information that may be stored across any number of data structures within such models (e.g., tables, objects, files), but may be collectively retrievable using well known data manipulation/querying techniques. Thus, the depiction of data herein as linear/unitary "records" and "fields" is for clarity of description only, and not intended to be limiting.

Also as discussed herein, a "person of interest", "player of interest," "entity of interest" or the like, may include a sports player (e.g., a baseball player, a football player, a coach, a manager, etc.), a group of players (e.g., a team), a "virtual" player (e.g., a virtual avatar, an avatar operating in a virtual/gaming world or a metaverse), or an autonomous entity engaged in game play (e.g., robots in a competition, simulated/computer-controlled player programs, artificial intelligence devices or routines, etc.) In general, a person of interest may include, for example, any identifiable entity engaged in a competitive environment.

Also as discussed herein, "real-word," "real-life" or "real" activity refer to activities engaged in by players of interest in the actual field of competitive activity that forms the basis for the fantasy game. For example, for sports-based fantasy games, the "real-word" would constitute sporting leagues that conduct sporting events in which the players of interest participate and accumulate statistics that are used to determine fantasy game performance. As another example, for computer game based fantasy games, the "real world" would constitute the gaming "world" in which the competing entities (e.g., avatars, computer simulated entities) accumulate statistics that are used to determine fantasy game performance.

The preferred embodiments described herein implement a system and method that includes facilities to compile media programming scheduling information associated with a user's fantasy teams/players and to generate presentation schedule information which can used by the user to plan viewing activity or schedule recording (for example, using a digital video recorder (DVR)). The user may also modify the generated presentation schedule through filtering options, such as based on certain players, positions or relative importance. In some embodiments, where there are games that are not available to the user due to the user's current subscription level, the user may be given the opportunity to upgrade the subscription level so that the unavailable games may become available. In some embodiments, a real-time statistical information facility is included that may provide real-time statistical information regarding the user's players, the user's team as a whole, and user's team's relative performance against opposing fantasy teams, such that a real-time picture of the user's team in comparison to their peers is possible, and the user may prioritize viewing/recording decisions.

FIG. 1 shows a preferred system 100 in which the embodiments described herein may be implemented. Content providers 110, 112, 114 provide media content inputs (e.g., video, audio, gaming data) to system 100. The media content may be in the form of live streams or delayed/bulk delivered content (e.g., "on-demand" content). Providers 110, 112, 114 may be entities that include general content providers (e.g., national broadcasting networks), specialized content providers (e.g., sports networks, financial networks, sports leagues or teams, video gaming providers), or simply archival inputs (e.g., tape/digital video disc (DVD)).

Communications links 120 connect each of providers 110, 112, 114 with distribution system 125. Communications links 120 may include any type of communications channel that allows for the flow of content to distribution system 125. Moreover, communications links 120 may include a combination of different physical communications facilities that may include, but is not limited to, digital transmissions elements, analog transmission elements, wired, wireless, and optical transmission mediums, as is well known.

Distribution system 125 receives the media content from each provider 110, 112, 114 and distributes the media content to access networks 180. Distribution system 125 may include a number of well-known elements, such as electrical, optical and or wireless networks, routers, switches, multiplexers, demultiplexers, encoders, decoders, compressors, decompressors, etc., for delivery of video content in analog and/or digital format. Distribution network 125 may also include facilities for bi-directional transmission of media content, for example, in Internet Protocol format. In the preferred embodiment, the distribution system 125 is the Verizon® FiOS TV distribution system.

Access networks 180 may include any network or networking technology, including: packet-switched networks (e.g., Ethernet, Internet Protocol, Asynchronous Transfer Mode), cable television networks (e.g., hybrid fiber-coax network), wireless networks (e.g., a satellite broadcasting network, terrestrial broadcasting network, wireless communications network, wireless LAN), telephone networks (e.g., the Public Switched Telephone Network), a provider-specific network (e.g., a TiVo network), an optical fiber network (e.g., a Passive Optical Network), or any other suitable network or combination of networks. In the preferred embodiment, the access network 180 includes at least one of the Verizon® FiOS network and the Verizon Wireless® wireless network.

One or more user systems 181 are connected to access network 180. Each user system 181 generally includes a media content processing subsystem 184, a display 182 and a user input device 186. An exemplary media content processing subsystem 184 may include any combination of hardware, software, and firmware configured to process media content. As used herein, the term "media content processing subsystem" refers expansively to all possible receivers that receive and process digital and/or analog media content. Hence, an exemplary media content processing subsystem 184 may include, but is not limited to, a set-top box ("STB"), home communication terminal ("HCT"), digital home communication terminal ("DHCT"), stand-alone personal video recorder ("PVR"), DVD player, video-enabled phone, gaming platform, and personal computer (e.g., a home theater PC ("HTPC")).

Media content processing subsystem 184 includes interfaces for receiving audio, video, and data from access network 180, and may be configured to process received media content, including causing the media content, or one or more components thereof (e.g., video, audio and/or data components), to be presented for experiencing (e.g., viewing) by a user. Media content processing subsystem 184 may use any suitable technology or technologies to receive media content from access network 180, including using a tuner to receive the media content, using demodulating, decoding and/or demultiplexing facilities, and using decompression and/or rendering facilities. Media content processing subsystem 184 may further include interfaces for output of media content to presentation devices for experience by the user (e.g., viewing, listening). For example, the media content processing subsystem 184 may provide a signal to a display device 182 (e.g., a television, computer monitor, a mobile phone display, etc.) so that the display device 182 may present (e.g., display) the media content for experiencing by the user.

Figure 6:
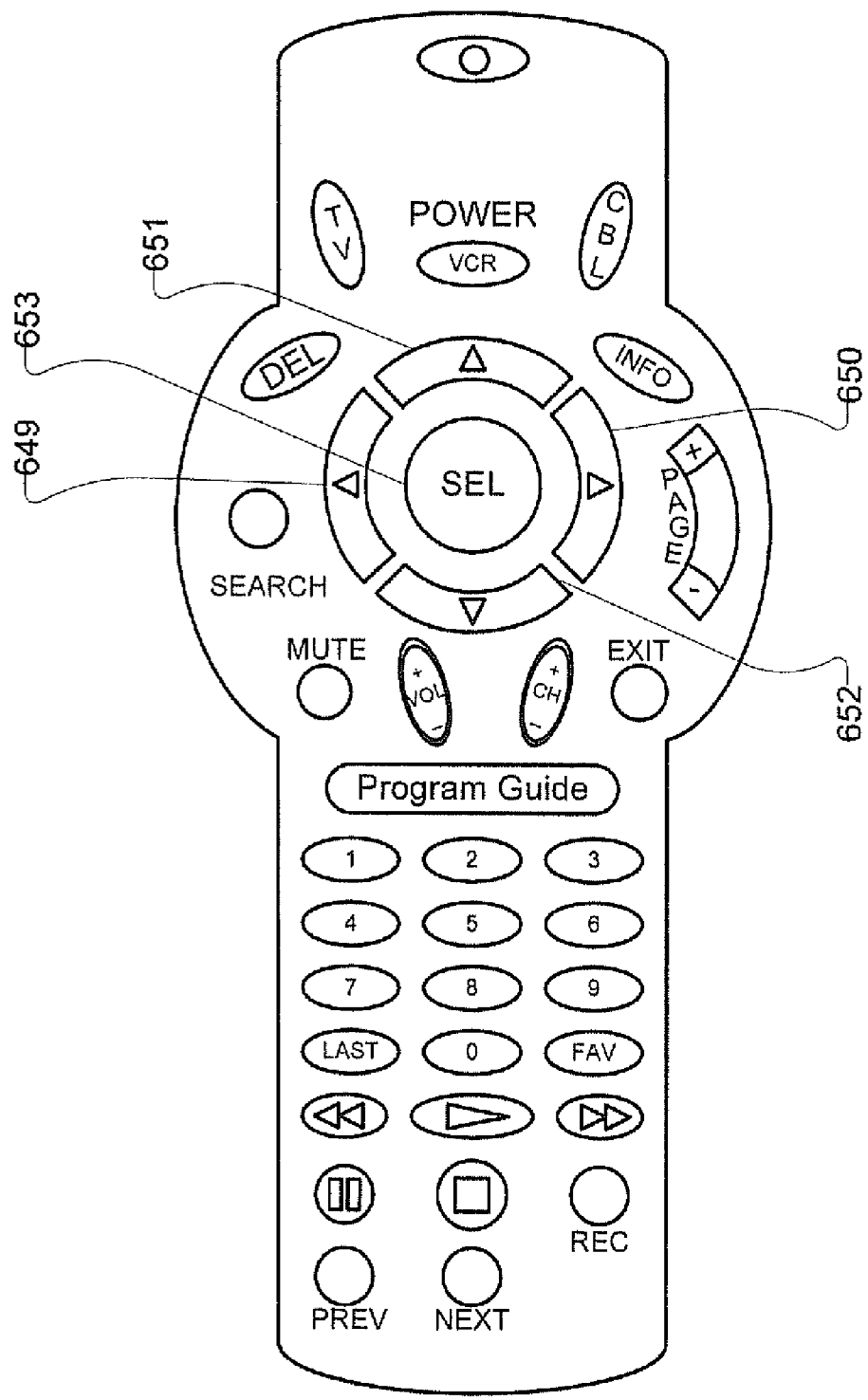
FIG. 6 is an exemplary user input device for use with the system of FIG. 1.

Media content processing subsystem 184 may also include interfaces for receiving user inputs via user input device 186, allowing the user to control and provide information to media content processing subsystem 184. Such interfaces may be wired or wireless. An exemplary input device 186 is shown in FIG. 6 in the form of an wireless remote control for controlling display of video content provided either live or from recording. For example, a left button 649, right button 650, up button 651, down button 652, and select button 653 may be included and configured to enable the user to navigate through various channels of media content, views and graphical user interfaces displayed by the display device 182. It will be recognized that input device 186 shown in FIG. 6 is merely illustrative of the many different types of user input devices that may be used in connection with the present systems and methods. For example, other types of input devices may be used for user input(s) 186 including, but not limited to, remote controls, keyboards, touch screens, and/or discrete button inputs.

In the preferred embodiment, media content processing subsystem 184 includes an interactive program guide facility and a digital video recorder (DVR) facility. The interactive program guide facility may be configured to receive program guide information from access network 180 and display program guide information, such that the user can navigate and select desired media content. The DVR facility allows users to record media content. The integrated program guide facility and DVR facility may be configured such that a user may use the program guide to select media content for recording, determine which media content has been designated for recording and display the media content that has already been recorded.

While an exemplary user system 181, user inputs 186, display 182, and media content processing subsystem 184 are shown in FIG. 1, the exemplary components illustrated in FIG. 1 are not intended to be limiting. Indeed, additional or alternative components and/or implementations may be used.

Figure 2:
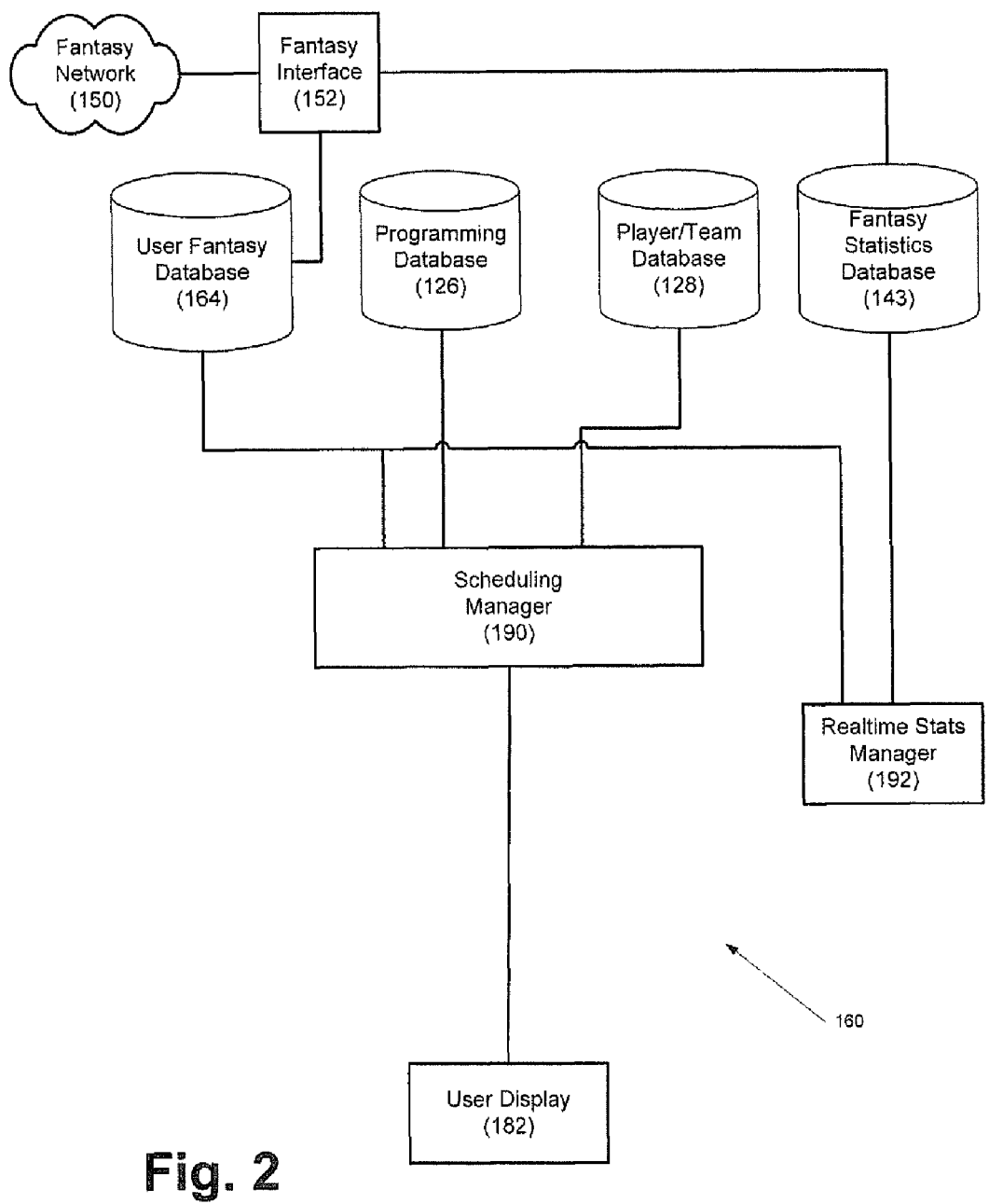
FIG. 2 is an example of a fantasy gaming system supporting performance scheduling.

FIG. 2 shows an exemplary implementation of a fantasy gaming presentation scheduling system 160, according to a preferred embodiment. Scheduling system 160 may be integrated within distribution system 125 (see FIG. 1), media content processing subsystem 184, or both (with components thereof distributed across both as desired).

Figure 3:
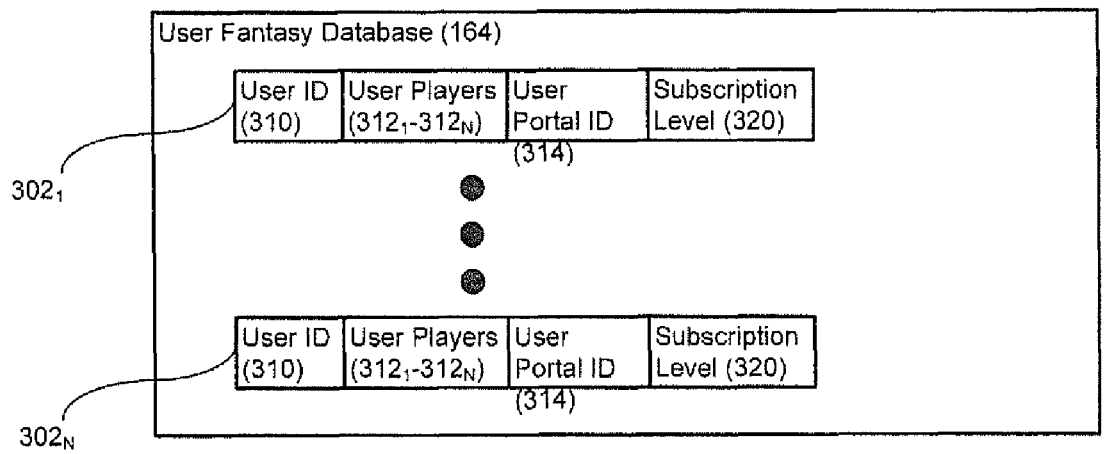
FIG. 3 is a partial record view of an example of a user fantasy database for use with the system of FIG. 2.

Exemplary scheduling system 160 includes a user fantasy database 164, which is generally a repository for information related to a user and a user's fantasy team information. Turning to FIG. 3, an exemplary user fantasy database 164 configured to store fantasy team data is illustrated. The exemplary user fantasy database 164 comprises a plurality of records $302_1$-$302_N$, each of which may include a user identifier 310, user players $312_1$-$312_N$, a user portal identifier 314, a subscription level 320, and subscribed devices identifiers 322. User identifier 310 is preferably a unique identifier or code assigned to each user and allows an index into user fantasy database 164. User players $312_1$-$312_N$ are a plurality of unique player identifiers, which may be used to identify which persons of interest (e.g. individual players, teams) are associated with a particular user's fantasy team, or which the user may have an interest in monitoring. User portal 314 may specify a particular fantasy service provider 150 (further described below) which the user is using to play the fantasy game, as well as other information associated with the user's account at the fantasy service provider 150 (e.g., user id, password, team name, league name, etc.).

Subscription level 320 describes the subscription "package" or depth of programming available to the user. Examples may include a "local" package where only local games of interest are available for viewing. Alternatively, there may be regional or unlimited subscriptions. The regional subscription may allow a user to access media content associated with a particular geographic region, while the unlimited subscription would, for example, provide a user with access to all media content at any time. Subscription level 320 may be used by system 160 as part of the scheduling process to determine which programming a user can access (or whether the user is given the opportunity to upgrade the subscription level 320 to obtain access to unavailable content), as is further described below.

Figure 4:
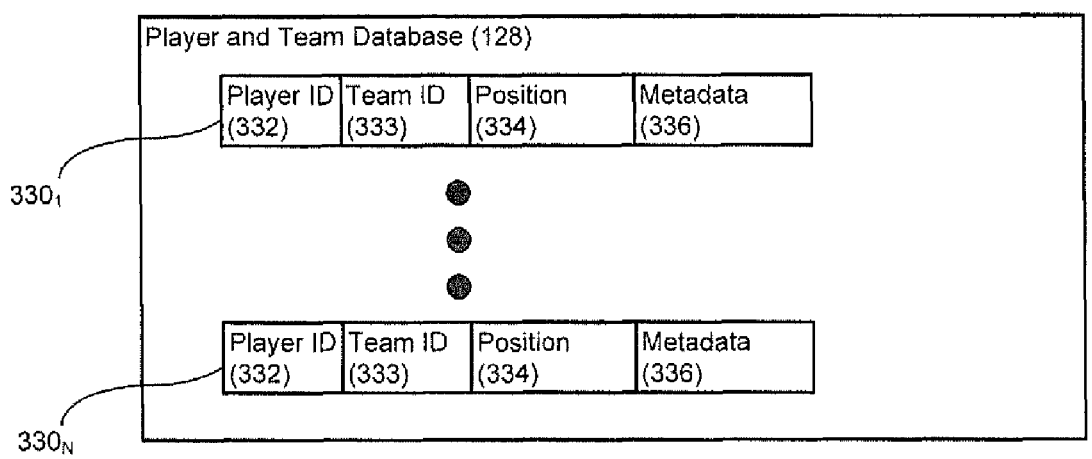
FIG. 4 is a partial record view of an example of a player and team database for use with the system of FIG. 2.

FIG. 4 is a partial record view of an example of a player and team database 128 for use with the system of FIG. 2. Player and team database 128 includes a player ID 332 (corresponding to player identifier 312 of FIG. 3) which uniquely describes a particular player. A team ID 333 uniquely identifies the team that player ID 332 is associated with. A position ID 334 indicates what position the player is assigned to (e.g., a quarterback or a running back). Metadata 336 can include information such as the player's name and the player's team name, as well miscellaneous information related to the player identified by player identifier 332 (such as a starting date with a team). Alternatively, system 160 may pull information regarding the players and teams from fantasy provider 150 (see below) directly without regard to player and team database 128. In another alternative example, where player and team database 128 is queried and a record does not exist, player and team database 128 may attempt to populate a new record based on the unfilled request by querying fantasy provider 150 and accumulating the record information. In this way, player and team database 128 may be auto-populated with information.

Figure 5:
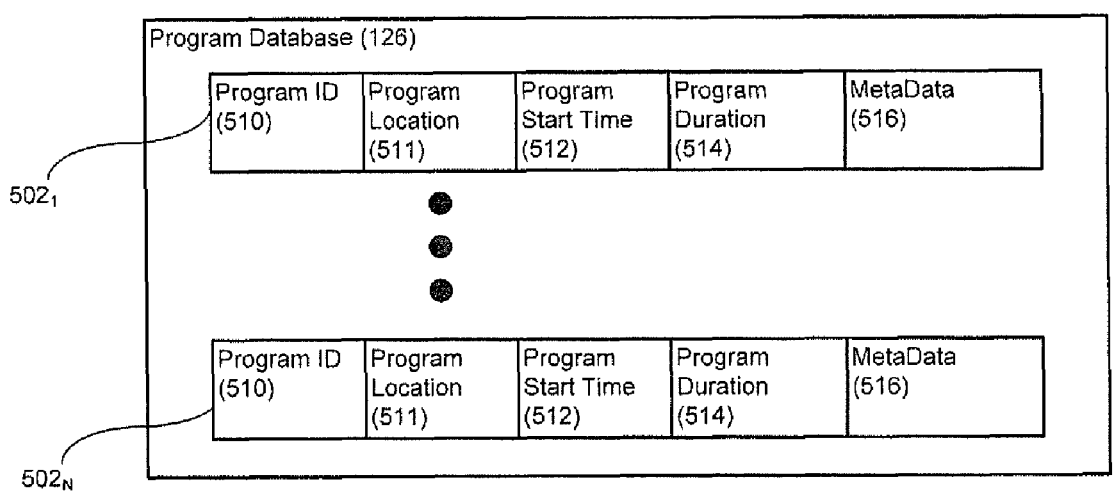
FIG. 5 is a partial record view of an example of a program database for use with the system of FIG. 2.

Turning to FIG. 5, an example of a program database 126 is shown. Program database 126 is generally a repository including multimedia program listing information. The listing information may include information regarding a temporal interval during which a multimedia program will be available to a population generally, or to a particular user based on the user's subscription level. The temporal interval may include a time, date, and/or duration related to the multimedia program. For example, a multimedia program listing may include a time and date that a sporting event will be televised. In another example where the multimedia program is an audio program rather than an audio/visual program, the multimedia program listing may include a time and date that an audio-only program (e.g., a radio show or a music event) will be available through internet protocol transmission, radio, cable, or other transmission mediums.

As shown in FIG. 5, an exemplary record of program database 126 associated with an item of media content, such as record $502_1$, may include a program identifier field 510, a program location field 511, a program start time 512, a program duration field 514, and a metadata field 516. Program identifier field 510 may be a alphanumeric field that can store a unique identifier for the instance of media content. Program location field 511 stores a location identifier which can be used to locate the content within distribution system 125. For example, program location 511 may correspond to a channel number, frequency number, network address, call letters, provider identifier, or other coding. Program duration field 514 describes the time length of the media content program and may be useful in determining how much time is required to watch the content, how much bandwidth is required to transport the content, etc. Metadata field 516 can include information about the program, which may include, for example, the game type (e.g., football, basketball, baseball, etc.), team names, player names, etc. Metadata field 516 may include information provided from providers 110, 112, 114 (see FIG. 1), including the teams playing, date of performance, duration of performance, and players active in the game, etc. However, metadata 516 may also include additional or enhanced information determined after being processed by system 100. As will be further described below, program database 126 may be queried to determine currently-playing or upcoming programming associated with particular players.

The databases 126, 128, 164 may be separate systems or may be partially or fully combined into a single system. Likewise, the databases 126, 128 and 164 may be located within distribution system 125, connected to distribution system 125 or access network 180, or within individual media content processing subsystems 184. The configuration being dependent on the needs of the service provider and capabilities of the equipment/networks involved.

Referring again to FIG. 2, system 160 may be connected to a fantasy service provider 150 which provides access to fantasy sports information related to a particular user. Fantasy service provider 150 may be part of the organization that provides system 160 (or system 100), or may be a separate entity. Fantasy service provider 150 may provide the underlying game logic and/or statistical information used in playing the fantasy game, and may also provide user interfaces that permit users to perform control actions with respect to their fantasy teams. Where fantasy service provider 150 is the same organization that is providing systems 100/160, the underlying game logic and user control interfaces may be integrated into the elements of system 100 (e.g., a menu-type display on a set top box (STB) that allows a user to enter their fantasy sports selections).

A fantasy interface 152 provides an interface to fantasy service provider 150 in order to receive information from and/or transmit information to fantasy service provider 150. In some embodiments, fantasy interface 152 includes security facilities and may perform data verification (e.g., where fantasy service provider 150 is a third-party and the connection is through a public network). For example, a user may be using a partner web-based fantasy gaming site that operates a fantasy football game. In this case, fantasy interface 152 will retrieve periodically (or at set times, such as immediately before the start of game play) the information related to that user's fantasy team (e.g., a current roster, currently active players) and populate user fantasy database 164 with such information. The current roster will allow system 100 to identify persons of interest to that user. In one alternative, where tighter integration is achieved between fantasy service provider 150 and fantasy interface 152, a facility may be available that automatically sends modifications/updates registered at fantasy service provider 150 to fantasy interface 152 on a real-time basis.

System 160 further includes a scheduling manager 190. Scheduling manager 190 handles the determination and provisioning of a presentation schedule to a user via media content processing subsystem 184, using the information stored in user fantasy database 164, player and team database 128 and program database 126. Scheduling manager 190 may be implemented at a user's media content processing subsystem 184 or may be implemented in another device within or connected to distribution system 125.

Figure 9:
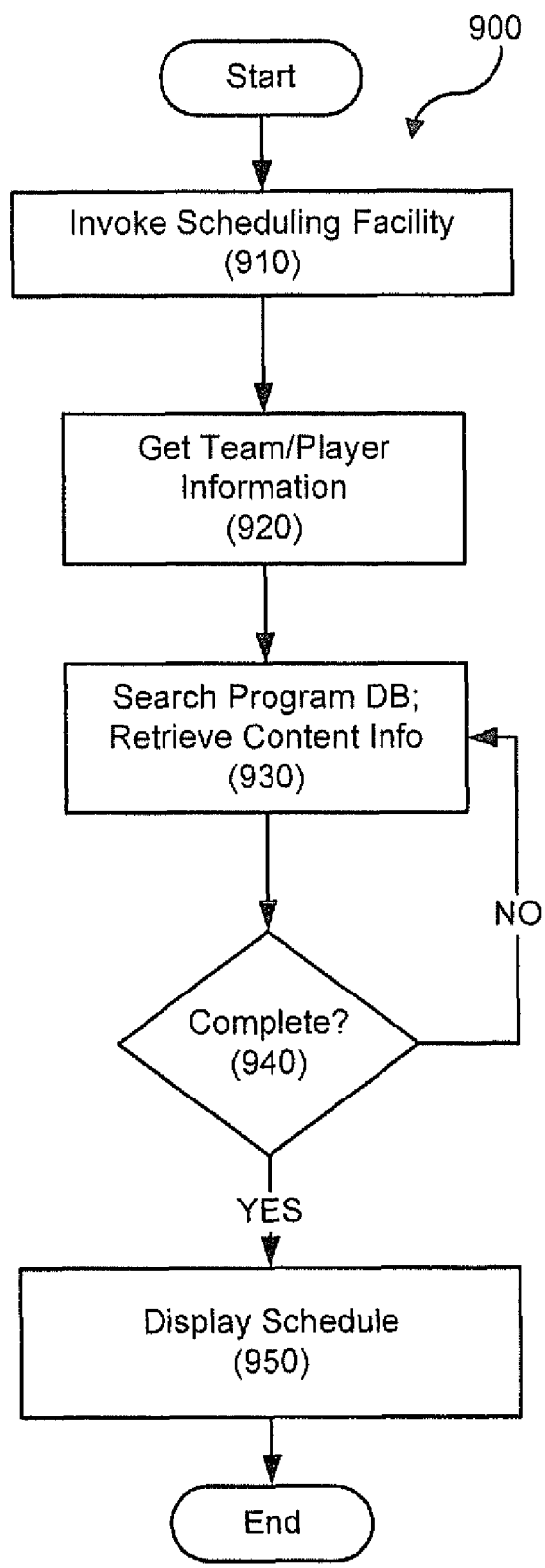
FIG. 9 is an example of a process flow for generating a presentation schedule based on fantasy information.

An exemplary method performed using system 160 (for example, in scheduling manager 190) is illustrated by FIG. 9. The process begins at step 910, where a user invokes the scheduling facility in order to determine a presentation schedule based on the user's fantasy team and players of interest. This may be pursuant to an input received from input device 186 requesting the scheduling service, for example, through a dedicated button or through an interface provided through media content processing subsystem 184. In step 920, the user's team and players of interest are retrieved from user fantasy database 164 (see FIG. 2). In some cases, user fantasy database 164 may need to be refreshed so that the most current player entity information is available (for example, just before games begin or when a team change lock-out period begins). If a refresh is requested, user fantasy database 164 may update the information using fantasy interface 152 and fantasy provider 150. When the user's team and players are retrieved, control proceeds to step 930.

At step 930, program database 126 is used to determine those items of media content available through distribution system 125 that are associated with the persons of interest for the user's team. As an example, user player fields $312_1$-$312_N$ of record 302, (see FIG. 3) are matched with player identifiers 332 in player and team database 128 to determine a team name 333 (see FIG. 4). The team identifier 333 may then be used to query program database 126 to determine what media content programs include games in which the player is currently participating or will be in the future. When a player's team is matched with metadata 516 (shown in FIG. 5), the listing information associated with the media content—for example, the program identifier 510, program location 511, program start time 512, program duration 514 and metadata 516 are retrieved. Control then proceeds to step 940.

At step 940, the process determines whether each player and/or team identified by user player fields $312_1$-$312_N$ (see FIG. 3) has been processed. If all players have not been processed, control proceeds to step 930 where the media search continues with the next player identified by user player fields $312_1$-$312_N$. Once all players have been processed, control proceeds to step 950.

Figure 7:
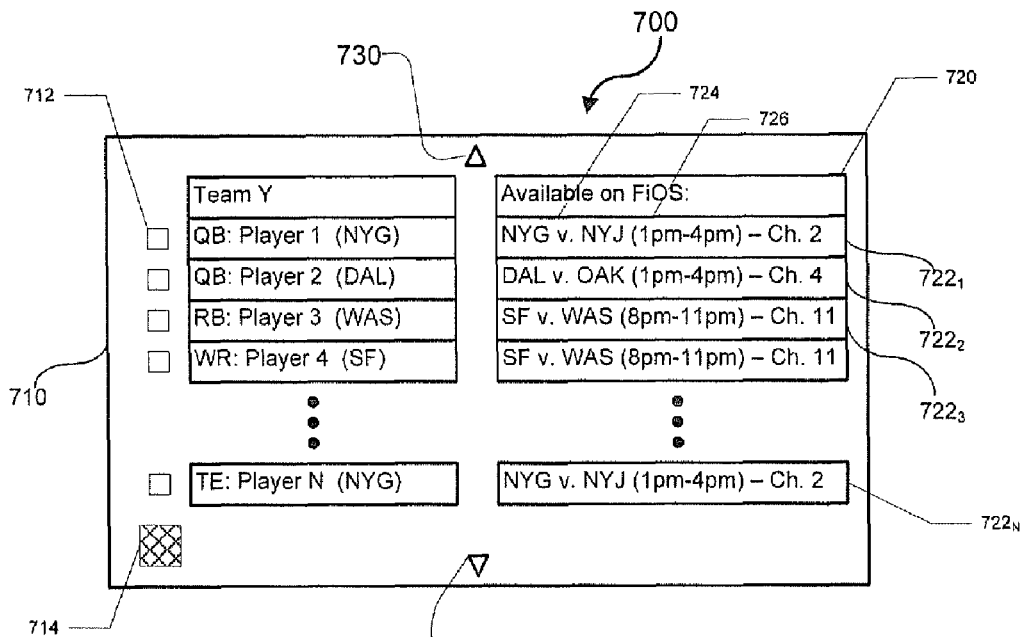
FIG. 7 is a first example of a schedule screen.

At step 950, a schedule screen is provided. FIG. 7 shows one example of a schedule screen 700 which indicates a presentation schedule based on the user's fantasy team. Exemplary schedule screen 700 includes a fantasy roster 710, including a listing of the players of interest associated with the user's fantasy team. The listing may be sorted, for example, by player name or position. As shown in FIG. 7, fantasy roster 710 is sorted by positions associated with a football team (e.g., quarterback (QB), running back (RB), wide receiver (WR), tight end (TE) and place kicker (PK)). Also included in screen 700 is a presentation lineup 720, which includes a plurality of gaming events available to the user for viewing or recording. As shown in FIG. 7, presentation lineup 720 includes a number of game listings 722, each having a game title 724 (e.g., New York vs. Chicago) and a game time 726. Game listings 722 may be presented as a linear list of entries; where more games are available than can be shown on a screen, selection buttons may be pressed at user input(s) 186 (shown in FIG. 1) that allow the user to scroll as shown with scroll up icon 730 and scroll down icon 732.

Figure 8:
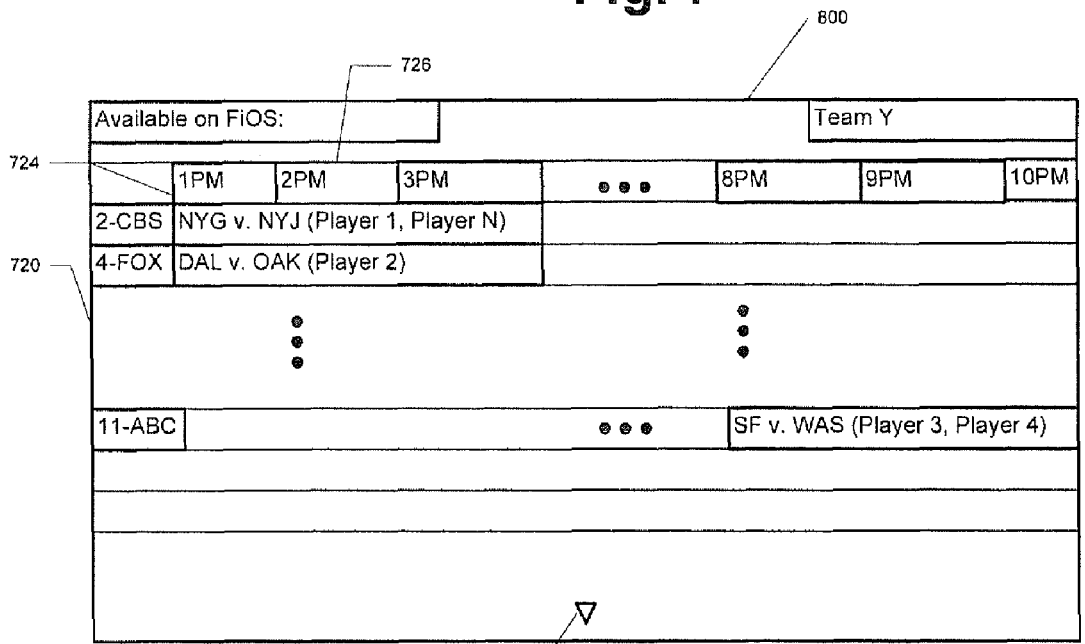
FIG. 8 is a second example of a schedule screen.

FIG. 8 shows another example of a schedule screen. Schedule screen 800 as shown in FIG. 8 also includes a fantasy roster 710 and a presentation lineup 720. In this example, fantasy roster is grouped by the item of video content in which the player of interest will be appearing. Presentation lineup 720 is arranged in a grid-like display, such that the temporal aspects of the items of media content can be seen. This screen 800 may be useful in determining which items of media content include the most number of players of interest, and how best to stagger viewing times to maximize player viewing. Screen 700 and screen 800 may be combined to generate screens with some or all of the elements depicted therein.

Figure 10:
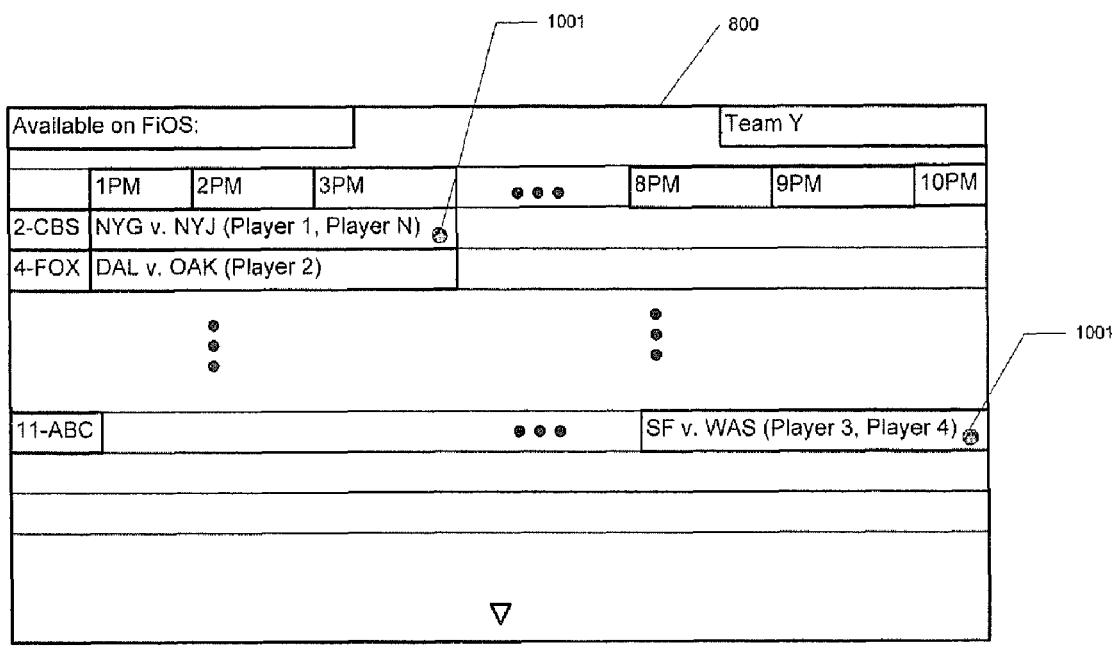
FIG. 10 is a third example of a schedule screen.

After the presentation schedule screen has been displayed, at step 960, the user may choose an item of media content to view and/or record. For example, the user may use the input device 186 to navigate through the presentation lineup 720 and select items of video content to view now, or schedule for recording by, for example, the DVR facility of media content processing subsystem 184. Presentation lineup 720 may then show for those items of media content that are selected for viewing/recording an indication of that selection (e.g., different color/shading, special symbol, etc.). In some embodiments, the scheduling manager 190 may include a facility to automatically generate an optimal viewing/recording setup based on criteria, such as achieving viewing of the most number of players of interest, by player rankings, etc. In such cases, the results of the automatically generated viewing/recording determination may be illustrated on the viewing lineup 720, and the user may be then able to manually adjust these selections as above. FIG. 10 illustrates the presentation schedule screen 800 (see FIG. 8), where certain items of media content have been marked for recording using indicators 1001.

In some embodiments, criteria may be specified that allow a user to filter out certain items of media content from the presentation lineup 720. For example, a user could select to have shown only the games of the players of interest that have contributed to the top fifty percent of the team's overall scoring totals. In another example, a user could select to have shown only games involving certain positions (e.g., quarterbacks or running backs). In yet another example, a user could select to have shown only games involving specifically designated players. Screen 700 illustrates one interface for providing filtering criteria. Associated with each entry in the fantasy roster 710 is a selection device 712 (e.g., a checkbox), where the user can indicate whether the player should be included as part of the schedule determination (e.g., using the input device 186). Also included in screen 700 may be an "apply filter" device 714 which may be selected by the user to cause the scheduling manager 190 to use the filter criteria to limit the display of presentation lineup 720. For example, where the user requests only games in which the user's quarterback(s) are playing, presentation lineup 720 may be searched for those game listings 722 that have metadata that match those teams which include a quarterback from the user's fantasy roster 710. If game listing 722 does not involve a team that includes a quarterback from the user's fantasy team, then game listing 722 is removed from game lineup 720. Other filtering methods are also possible.

In some embodiments, a determination of the subscription level of the user may be included as part of the process. For example, once an item of media content has been determined to be associated with a person of interest, it may further be determined whether the item of media content is within the user's subscription level 320. If the item of media content is not available within the user's subscription level 320, then presentation schedule screen presented to the user may be altered. Using the example of schedule screen 700 for purposes of illustration, schedule screen 700 may exclude from the presentation lineup 720 any game listings 722 corresponding to the unavailable content. Alternatively, schedule screen 700 may include game listings 722 corresponding to the unavailable content in the presentation lineup 720, but may indicate the unavailability of the content (e.g., using shading, coloring, or other indicators).

In some embodiments, users may be permitted to select items of content that are not available within their subscription level through an interface for purchasing an enhanced subscription level. FIG. 12 is an example process flow 1200 for notifying a user of unavailable content due to a lower subscription level and providing an opportunity to obtain a higher subscription level to obtain access to the content. In step 1210, it is determined whether particular items of content are within the user's subscription level 320. This may be performed in conjunction with the process described above and illustrated in FIG. 9 (or as a separate activity). As an example, when a item of content is determined to be associated with a user's persons of interest, the program identifier for the content may be used to perform a check against the users subscription level 320. This check may be performed through a query to distribution system 125 (which may maintain records that associate user subscription levels and content access permissions) or may be performed without such a query (e.g., where the subscription level itself indicates whether the content is included, where the program listing information itself includes an indication of the subscription level required for access, where a user's media content processing subsystem maintains this information locally, etc.).

At step 1220, an indication is provided to the user that particular items of content are not available to the user due to the lack of a sufficient subscription level. The indication may be as described above, where the unavailable content is indicated through an indicator associated with the game listings 722. The indication may also take the form of a message to the user (e.g., a pop-up message) that one or more of game listings 722$_1$-722$_N$ is not available due to the user's low subscription level. The message may also give the user the opportunity to "upgrade" their subscription level in order to access the game content. The message may include the cost and terms of any available upgrades (for example, a one-time upgrade may have a one-time cost, a permanent upgrade may have a recurring subscription cost), and may permit the user to select which of the unavailable content the user wishes to obtain. The messaging interface may be used in combination with the indicators in the presentation lineup 720 for example, once a user attempts to select a game listing 722 that has been indicated as unavailable, a message may be presented indicating unavailability and providing the upgrade opportunity.

If the user indicates a desire to request an upgrade (step 1225), in step 1230, the user's upgrade request is sent to distribution system 125 for processing. The request may be included in a message to system 125, which may cause the system 125 to access customer records associated with the user to ensure proper billing authorization and to set appropriate subscription level information. In step 1240, a response from distribution system 125 may then indicate the new subscription level, and the presentation schedule screen may be updated to reflect the availability of additional content based on the new subscription level. System 160 may accordingly update the user's subscription level 320 in user fantasy database 164.

In some embodiments, a facility is provided to allow a user to quickly determine whether any media content is currently being provided over distribution system 125 that is associated with the user's persons of interest. Such a facility may be useful for the user, for example, when watching games so that the user may quickly switch to others games which are in progress, relevant to the user and are available to the user. FIG. 11 is an example of a process flow 1100 for determining currently available media content associated with a user's players of interest. The process begins at step 1110 where the user requests a list of current programming. This request can be received from the user via the user input device 186, and may be available through a dedicated button on user input device 186 or through a selection interface (e.g., provided via media content processing subsystem 184). At step 1120, the user's team and players of interest are retrieved from user fantasy database 164 (see FIG. 2). This may be performed similarly to step 920 of process 900 (see FIG. 9). At step 1130, program database 126 is used to determine those items of video content available through distribution system 125 that are associated with the persons of interest for the user's team, and which are currently available. This step may be performed similarly to that of step 930 in process 900 (see FIG. 9), with the addition that there may also be a determination of whether the item of content is currently available. The information associated with matching media content—for example, the program identifier 510, program location 511, program start time 512, program duration 514 and program metadata 516 are retrieved.

Figure 16:
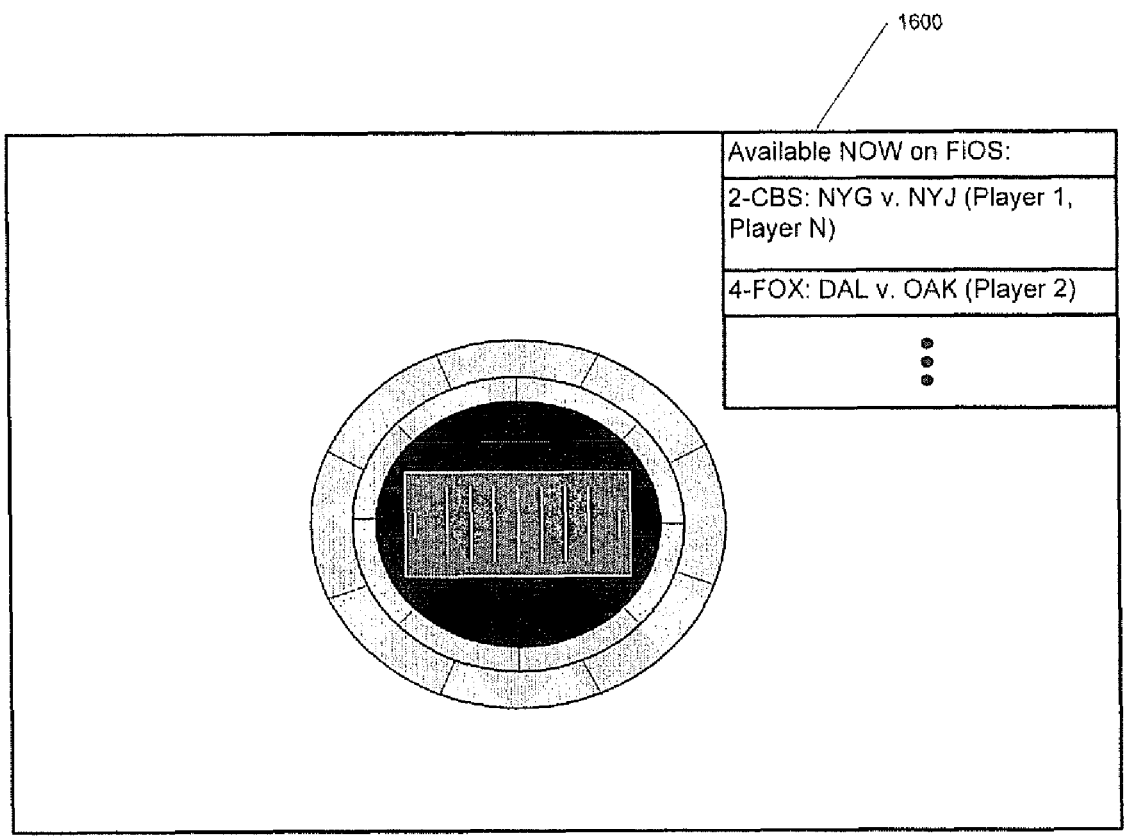
FIG. 16 is a third example of a screen including real-time statistical information.

At step 1140, a list of currently available content (e.g., games in progress) is compiled and provided as a schedule screen. In one embodiment, the schedule screen 700 (see FIG. 7), may be used to display the currently available content, in a manner similar to that described above. Alternatively, the list of currently available content may be displayed as a small window adjacent to or overlapping with the currently viewed content, thus allowing the user to continue to view the currently viewed content while viewing/selecting other content for viewing/recording. FIG. 16 illustrates one example of such a schedule screen 1600. In this example, a small number of game listings are shown (as well as the associated players of interest), and the user may scroll through each game listing to view/select the content for viewing and/or recording. The number of game listings presented may be based on the desired size of the schedule screen, and can encompass one game listing to all the available game listings. Furthermore, in those embodiments that support it, the user may be able to upgrade a subscription level to obtain access the currently playing content, similar to that described above.

In some embodiments, a real-time statistics facility may also be included in system 160, such that fantasy statistics can be presented to the user while the user is viewing content. Providing such statistics allows the user to track the progress of players and/or teams in real-time both for entertainment purposes (e.g., to monitor performance against other fantasy sports owners' teams) and also allows the user to make viewing decisions based on the real-time statistics (such as viewing a different or more interesting game). As one example of such a system. FIG. 2 includes a real-time statistics manager 192, which provides real-time or near real-time information to user system(s) 181 regarding the current status and points standings of the user's fantasy team and/or individual players. Real-time statistics manager 192 may be in communication with fantasy statistics database 143, which in this example stores statistical information related to the performance of players of interest relative to the fantasy game. In other embodiments, real-time statistics manager 192 and fantasy statistics database 143 may be combined in a single entity, and may located within distribution system 125, user systems 181, or a combination of the two.

Figure 15:
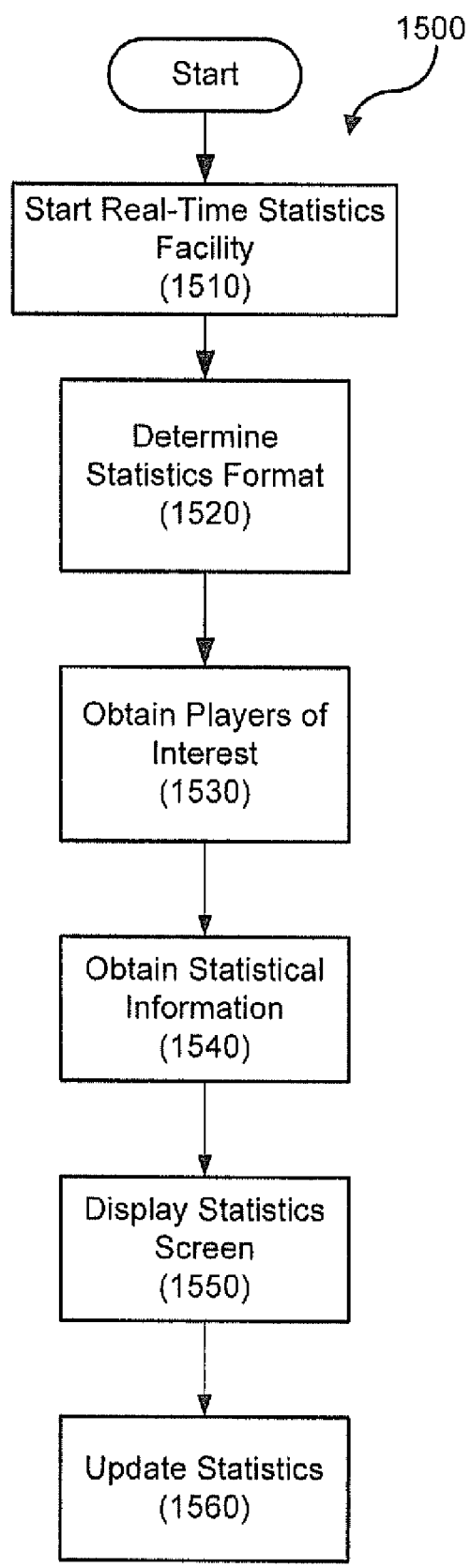
FIG. 15 is a process flow for reporting real-time statistics for use with the system of FIG. 2.

FIG. 15 illustrates an example of a process 1500 for providing a real-time statistics facility to users. In step 1510, a request is received to provide the real-time statistics facility. The request can come in multiple forms. In one arrangement, the user can provide an input via input device 186 that requests the statistics facility (e.g., through a dedicated button on input device 186 or an interface provided through media content processing subsystem 184). In other arrangements, the real-time statistics facility may be automatically requested, for example, in connection with requesting the viewing schedule facility (described above), or selecting a particular content item from the viewing schedule screen for viewing. In step 1520, it may be determined in what format the real-time statistics should be presented. In the preferred embodiment, the user can have real-time statistics presented just for players of interest associated with the user's team, for players of interest of the user's team and another team's players, or aggregated statistics for multiple teams. If no selection is made, the format may default to one of the available formats (e.g., players of interest only). The selection may also be made after initial display of a particular format—the user may indicate a desire to change formats, or such change may occur automatically (e.g, after a period of time).

In step 1530, real-time statistics manager 192 communicates with user fantasy database 164 to retrieve fantasy player information. Real-time statistics manager 192 may communicates with user database 164 to retrieve the user's fantasy players $312_1$-$312_N$ and, where formats have been selected that include other teams, the fantasy players from those other teams. In step 1540, real-time statistics manager 192 obtains statistical information from fantasy statistical database 143 associated with the fantasy players identified in step 1530. For example, real-time statistics manager 192 may obtain an initial set of statistical information from fantasy statistical database 143, and may thereafter receive updated statistical information (e.g., at the time of updates to fantasy statistical database 143 or at regular intervals). Examples of such statistics can be measures of performance of players (e.g., yards accumulated, runs scored, points, targets hit), points related to fantasy play (e.g., +6 for touchdown, +3 for field goal) and the status of a player (e.g., playing, not playing, injured).

Figure 13:
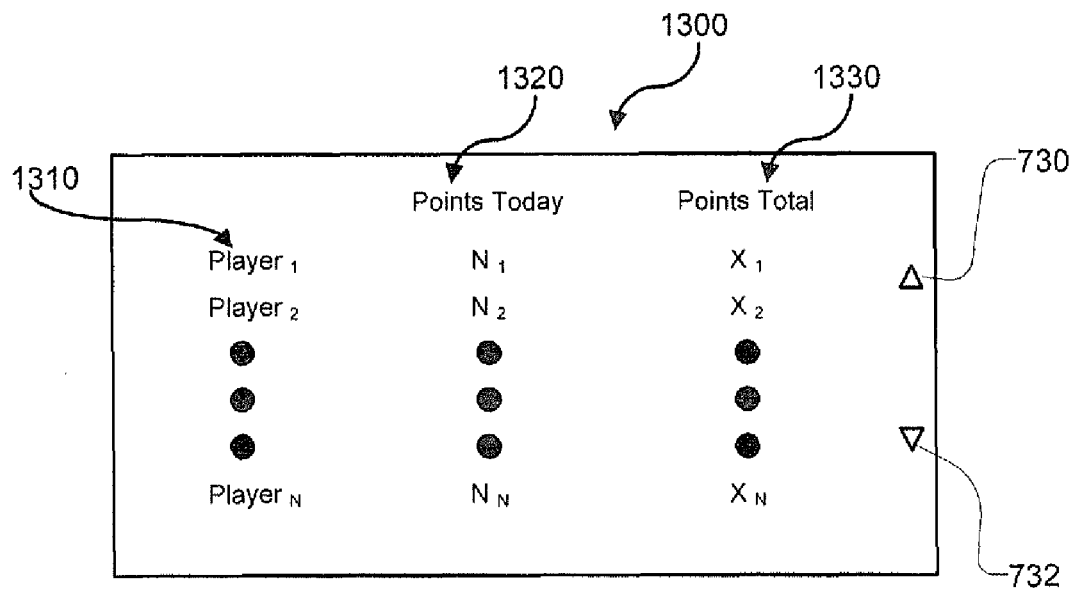
FIG. 13 is a first example of a screen including real-time statistical information.
Figure 17:
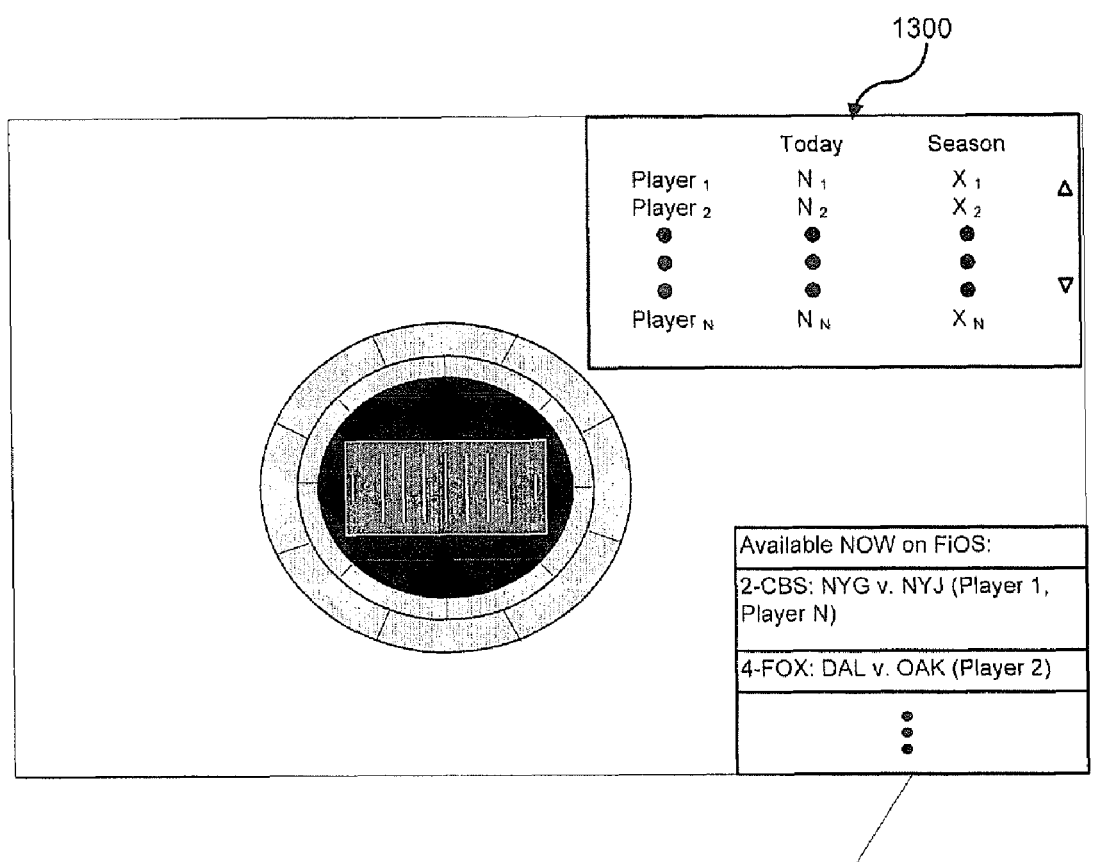
FIG. 17 is a fourth example of a screen including real-time statistical information.

In step 1550, a real-time statistics display is provided to the user. The display can take many forms, and may be dictated by the format selected (see Step 1520). One example of a real-time statistics display is shown in FIG. 13. Screen 1300 may be used to show real-time information about particular players of interest for various time periods—for example, today, the current week, and/or for an entire season. In screen 1300, players are listed in a player column 1310 on the left of screen 1300 and identified by their player names (e.g., $Player_1$-$Player_N$). A "points today" column 1320 indicates the points attributed to each player listed in player column 1310. A "points total" column 1330 indicates the total points for the season for each player listed in player column 1310. Screen 1300 may be displayed, for example, in a corner of a display 182, such that currently viewed content may continue to be viewed, such as illustrated by FIG. 17.

Figure 14:
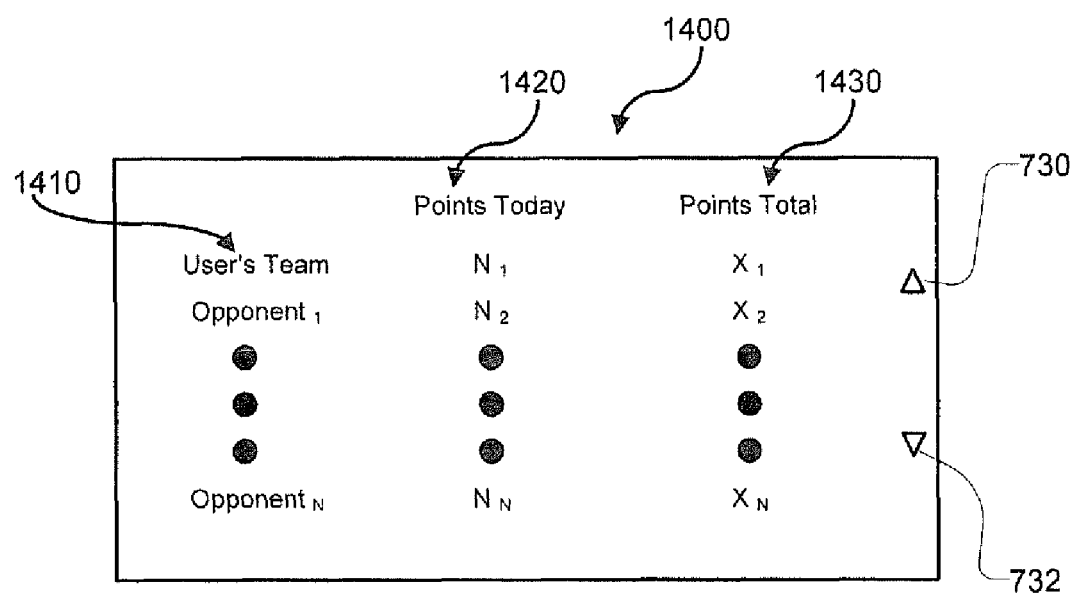
FIG. 14 is a second example of a screen including real-time statistical information.

Another example of real-time statistics display screen is show in FIG. 14, which shows a screen 1400 that includes real-time information about a user's team as compared to the user's opponents. A team column 1410 shows the user's team as well as the user's opponents (e.g., $Opponent_1$-$Opponent_N$). A "points today" column 1420 indicates the points accumulated today for each team in team column 1410. A "points total" column 1430 indicates the total points for each team in team column 1410. Team column 1410 may be organized in any manner including the user's team at the top, alphabetically, or by "points today" 1420, or "total points" 1430. As with screen 1300 (see FIG. 13), screen 1400 may be displayed, for example, in a corner of the display 182, such that currently viewed content may continue to be viewed.

Figure 18:
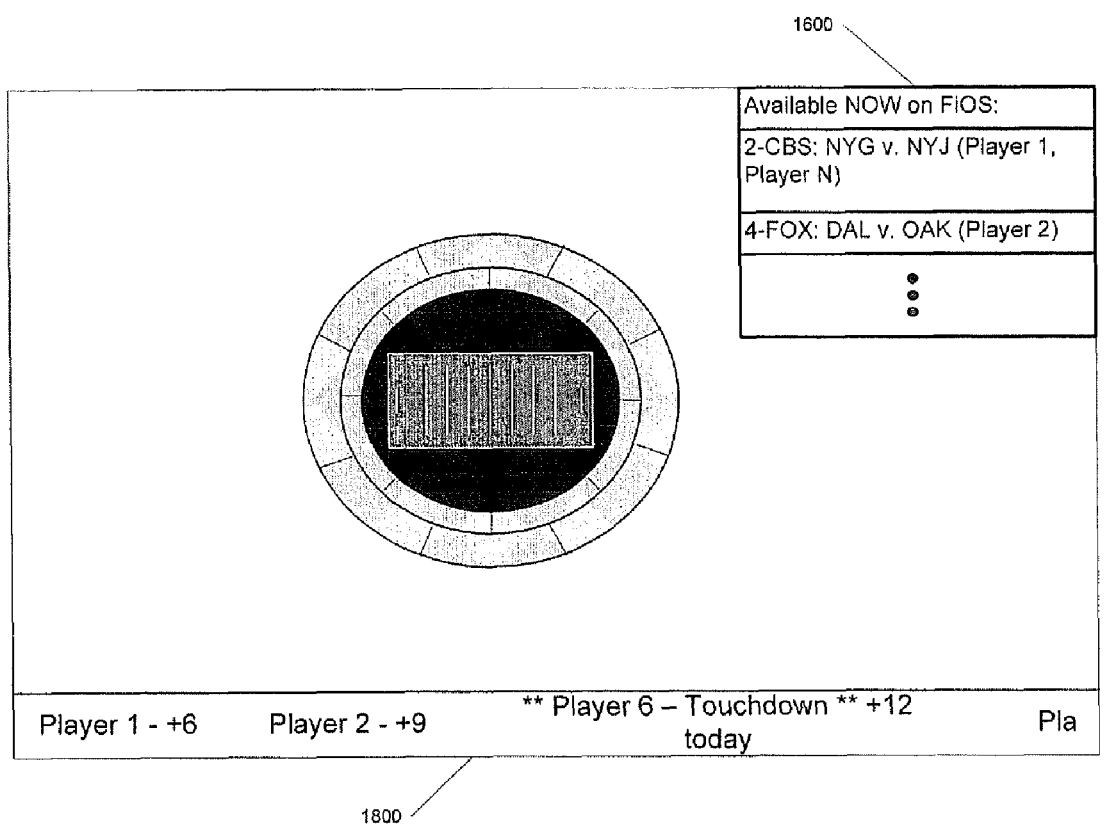
FIG. 18 is a fifth example of a screen including real-time statistical information.

Another example of a real-time statistics display screen is show in FIG. 18, which shows a screen 1800 that includes a "ticker" (e.g., a scrolling display) that provides statistical information. In this example, statistical information related to player and/or team performance can be shown. For example, the ticker may show current statistical information for players and/or teams (e.g., "Player X-6 points today, 30 points this week", "Team Y-50 points today"), and can show the most recent updates (e.g., "Player X-touchdown, +6 points"). Screen 1800 may be positioned, for example, at the bottom of display 182, to allow the user to continue to view the currently displayed content.

In step 1560, the contents of the real-time statistics display are periodically updated. As described above, the real-time statistical manager 192 may receive updated statistical information from fantasy statistical database 143. This updated information may be presented in the real-time statistics display, according to the format and layout of the display. For example, in the example of screen 1300, when a statistical update indicates that a player's points have changed, the "points today" 1320 column and "points total" 1330 column entries for that player may be updated. Likewise, if the updated information indicates that a team's points have changed, the entries for the team in screen 1400 may be updated appropriately.

In some embodiments, the real-time statistics facility may provide users with the ability to obtain additional information through the real-time statistics display by selecting the displayed entries. For example, a user might select a particular player from player column 1310 on screen 1300 using input device 186, in which case the real-time statistical facility can retrieve more detailed information concerning the player, such as news, status, more detailed statistical information and possibly highlights that are available for viewing (as described in more detail in co-pending U.S. application Ser. No. 11/859,356, filed the same day as the present application and being entitled "HIGHLIGHTS MANAGEMENT FOR FANTASY GAMING," said co-pending application being hereby incorporated herein by reference in its entirety). Similar details might be made available through the selection of team entries in screen 1400, or the selection of a team entry may cause the real-time statistical display to switch to screen 1300 to provide details regarding the players comprising the selected team.

CONCLUSION

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain examples and should in no way be construed to limit the claimed invention.

The processes described herein may be implemented at least in part as instructions executable by one or more computing devices, In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media (also referred to as a processor-readable media). Such media may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

It is to be understood that the above description is intended to be illustrative and not restrictive. Many implementations and applications other than the examples provided herein would be apparent upon reading the above description. It is anticipated and intended that future developments will occur related to the technologies discussed herein, and that the disclosed systems and methods will be incorporated into such future examples. No single feature or element described herein is essential to all possible combinations that may be claimed in this or a later application. The scope of the invention should thus be determined, not as limited to the above description, but should instead be determined with reference to the appended claims, along with the full scope of equivalents to which such claims are entitled. The use of the singular articles such as "a," "the," "said," etc. should be read to recite one or more of the indicated elements unless a claim recites an explicit limitation to the contrary. The use of "coupled" in describing a relationship between two entities should be read to mean the ability of the two entities to exchange information in the manner contemplated and as well known, and encompasses the use of intervening elements (e.g., networks, interfaces, conductors, data structures, methods, etc.), and does not require physical contact, proximity or direct connection, unless otherwise specified.

What is claimed is:

1. A system comprising: a processor;
   a user database including information concerning a fantasy game, the information representing players of interest engaged in a real-life competitive activity that forms a basis for the fantasy game;
   a program database including multimedia program listing information associated with a plurality of multimedia programs, said multimedia program listing information specifying temporal intervals during which the multimedia programs are available; and
   a scheduling manager coupled to the user database, the program database and the processor, the scheduling manager configured to direct the processor to:
   determine, based on the information representing the players of interest in the user database and the multimedia program listing information in the program database, a number of the multimedia programs that are associated with the players of interest,
   determine, based on performance statistics representative of performances of the players of interest in the real-life competitive activity, at least one media program from the number of media programs determined to be associated with the players of interest, and
   provide a scheduling screen containing at least one identification of the at least one media program determined based on the performance statistics.

2. The system of claim 1, wherein the scheduling manager is further configured to receive a request to use the scheduling manager, and wherein the temporal intervals are contemporaneous with said request to use the scheduling manager.

3. The system of claim 1, wherein the scheduling manager is further configured to receive a selection of the at least one multimedia program, the selection indicating at least one of presenting the at least one multimedia program on a display and recording the at least one multimedia program.

4. The system of claim 1, wherein the real-life competitive activity includes a sporting competition and the players of interest include at least one of a sports player and a sports team participating in the sporting competition.

5. The system of claim 1, wherein said scheduling screen provides indications of media programs that are unavailable to a user.

6. The system of claim 5, wherein said multimedia programs that are unavailable to the user are unavailable because of a subscription level of the user, and wherein the scheduling manager is further configured to receive an indication from the user requesting a change to the subscription level of the user in order to access said multimedia programs that are unavailable to the user.

7. The system of claim 1, further comprising a real-time statistics manager configured to determine said performance statistics representative of the performances of the players of interest in the real-life competitive activity and present a real-time statistics display including said performance statistics.

8. The system of claim 7, wherein said real-time statistics display includes at least one of a user's fantasy roster and an opponent's fantasy roster.

9. The system of claim 7, wherein the real-time statistics manager is configured to present the real-time statistics display at the same time that the at least one media program is displayed.

10. The system of claim 7, wherein the real-time statistics display comprises a scrolling ticker display.

11. The system of claim 1, further comprising:
a player database including information concerning the players of interest, the information including a team with which each of the players of interest is associated;
wherein the scheduling manager is further configured to correlate the information concerning the players of interest in the user database with the information concerning the players of interest in the player database to determine the team with which each of the players of interest is associated, and to use the determined team with which each of the players of interest is associated to determine the number of the multimedia programs that are associated with the players of interest.

12. The system of claim 1, wherein the scheduling manager is further configured to filter out, based on the performance statistics representative of the performances of the players of interest in the real-life competitive activity, at least one other media program from the number of media programs determined to be associated with the players of interest.

13. A method, comprising:
retrieving, by a computing device, information concerning a fantasy game from a user fantasy database, the information representing players of interest engaged in a real-life competitive activity that forms a basis for the fantasy game;
determining, by a computing device, based on the information representing the players of interest and on multimedia program listing information associated with a plurality of media programs, a number of the media programs that are associated with players of interest;
determining, by a computing device, based on performance statistics representative of performances of the players of interest in the real-life competitive activity, at least one media program from the number of media programs determined to be associated with the players of interest; and
providing, by a computing device, a scheduling screen containing at least one identification of the at least one media program.

14. The method of claim 13, wherein the real-life competitive activity includes a sports league, the players of interest include a plurality of sports players, and the number of the media programs determined to be associated with the players of interest comprise multimedia representations of sporting competitions in which at least some of said plurality of sports players are participants.

15. The method of claim 13, further comprising:
receiving, by a computing device, a request to initiate the scheduling manager;
wherein said number of media programs are further associated with temporal intervals during which said number of media programs are available, and wherein the temporal intervals are contemporaneous with said receiving of said request to initiate the scheduling manager.

16. The method of claim 13, further comprising:
receiving, by a computing device, a selection of the at least one media program, the selection indicating at least one of presenting the at least one media program on a display and recording the at least one media program.

17. The method of claim 13, further comprising:
determining, by a computing device, said performance statistics representative of the performances of the players of interest in the real-life competitive activity; and
presenting, by a computing device, a real-time statistics display including said performance statistics representative of performances of the players of interest in the real-life competitive activity.

18. The method of claim 13, further comprising:
providing, by a computing device, indications of media programs that are unavailable to a user; and
receiving, by a computing device, an indication from the user requesting a change to the user's subscription level in order to access said unavailable media programs.

19. The method of claim 13, wherein the determining of the number of the media programs that are associated with the players of interest includes:
correlating the information representing players of interest with information concerning the players of interest in a player database to determine a real team with which each of the players of interest is associated, and
using the determined real team with which each of the players of interest is associated to determine the number of the multimedia programs that are associated with the players of interest.

20. The method of claim 13, further comprising:
receiving, by a computing device, statistical criteria;
wherein the determining the at least one media program further comprises determining that at least one of the players of interest associated with the at least one media program is associated with performance statistics that meet the statistical criteria.

21. The method of claim 20, wherein the statistical criteria specify a minimum performance-based ranking of a player of interest within the players of interest in comparison with other players of interest within the players of interest.

22. A method comprising:
determining, by a computing device, a number of players associated with a fantasy team included in a fantasy sports game, each of said number of players associated with a real team within a real-life sports league that forms a basis for the fantasy sports game;
determining, by a computing device, a number of media programs associated with the number of players, including using the real team associated with each of said number of players to query multimedia program listing information;
determining, by a computing device, based on performance statistics representative of performances of the number of players in the real-life sports league, at least one media program from the number of media programs determined to be associated with the players;
presenting, by a computing device, on a display, a media program presentation schedule including at least one identifier of said at least one media program; and
receiving, by a computing device, a user input to select said at least one media program, wherein said selection indicates at least one of a request to view said at least one media program or a request to record said at least one media program.

23. The method of claim 22, further comprising:

displaying, by a computing device, a media program at the same time as the presenting of said at least one identifier of said at least one media program.

24. The method of claim 22, further comprising:

filtering, by a computing device, said at least one identifier of said at least one media program based on user criteria.

25. The method of claim 22, further comprising:

displaying, by a computing device, real-time statistical information representative of the performance statistics of the number of players at the same time as the presenting of said at least one identifier of said at least one media program.

\* \* \* \* \*